May 12, 1970 HIROSHI MIZUNO 3,511,935

AUTOMATIC TELEPHONE ANSWERING DEVICE WITH A REMOTE CONTROL SYSTEM

Filed May 31, 1967

INVENTOR

HIROSHI MIZUNO

BY Sughrue, Rothwell, Mion, Zinn & Macpeak

ATTORNEYS

United States Patent Office 3,511,935

Patented May 12, 1970

3,511,935

AUTOMATIC TELEPHONE ANSWERING DEVICE WITH A REMOTE CONTROL SYSTEM

Hiroshi Mizuno, Chiba, Japan, assignor to Pioneer Electronic Corporation, Tokyo, Japan Filed May 31, 1967, Ser. No. 642,361

Claims priority, application Japan, May 31, 1966, 41/34,523

Int. Cl. H04m *11/00;* G11b *5/00*

Int. Cl. 179—6 1 Claim

ABSTRACT OF THE DISCLOSURE

An automatic telephone answering device provided with a remote control system which is operated by a control signal sent through a telephone line.

CROSS-REFERENCE TO RELATED APPLICATION

Ser. No. 627,072, filed Mar. 30, 1967; title of invention: An Automatic Telephone Answering Apparatus Provided With A Remote Control System.

BACKGROUND OF THE INVENTION

The field of art to which this invention pertains is broadly classified as telephony and more specifically telephone answering devices. It is well known that there is an automatic telephone answering device which rewinds a tape for incoming messages when a remote control signal is sent to the device through a telephone line, then reproduces and sends out said messages to the owner of the device.

SUMMARY OF THE INVENTION

In this invention, the owner of the device can hear incoming messages which have been already recorded by using the control signal, and after that, one can erase the messages automatically; thus, making the recording capacity of the tape large. If the erasing system has not been set, incoming messages which have been already recorded can be retained without being erased.

When incoming messages are recorded on the upper track of the tape, the tone signal which is generated by an oscillator in the device is recorded on the lower track in parallel with said recording of incoming messages. In case the automatic telephone answering device is called upon to operate, one tape for outgoing messages begins to run and the messages are reproduced and sent out to a caller through the telephone line; then another tape for incoming messages begins to run and the incoming messages are recorded. If the caller (who is, in this case, the owner of this device) sends a control signal to this device through a telephone line, when the tape for incoming messages begins to run, said tape is rewound completely, and incoming messages having previously been recorded thereon are reproduced and sent out through the telephone line. After reproducing the whole recorded portion of the tape, if the erasing system has been set, the tape is automatically rewound again to its beginning end, and, at the same time, the recorded messages which have been reproduced are now erased, the tape stops and the automatic telephone answering device returns to the state of standby. However, if the erasing system has not been set, the automatic telephone answering device returns to the state of standby after above-mentioned reproduction.

DESCRIPTION OF THE PREFERRED EMBODIMENT

Figures 1, 2:
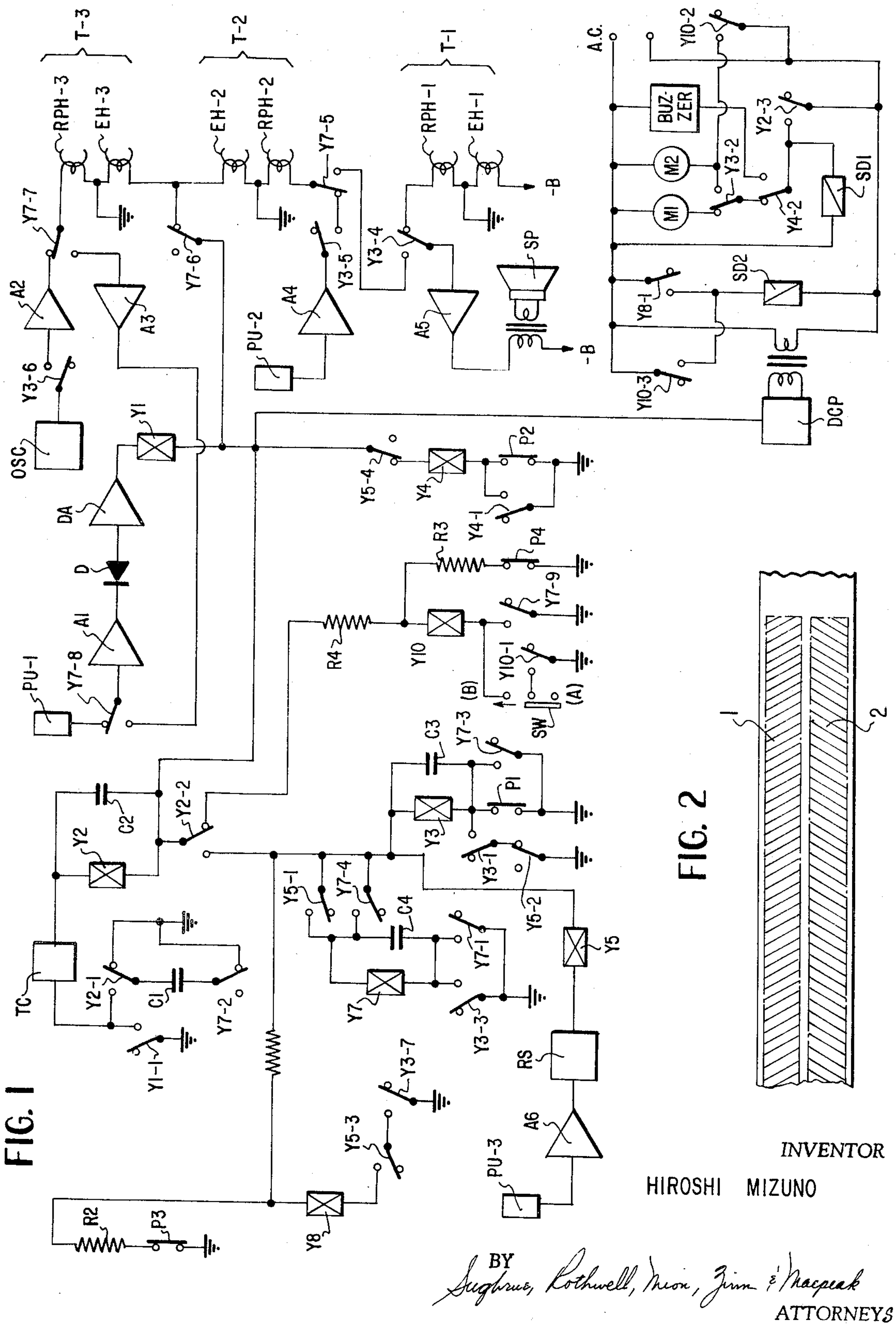
FIG. 1 is a circuit of an automatic telephone answering device embodying the present invention.
FIG. 2 is a section of the tape being used in the automatic telephone answering device which is shown in FIG. 1.

In the drawings, PU–1, PU–2 and PU–3 are the receiving devices, for example, such as a pick-up coil or microphone. The bell signals are picked up by PU–1, incoming messages by PU–2, and remote control signals by PU–3. A1–A6 are amplifiers. Y1–Y10 are relays. Each relay has several contacts. The contacts of relays, for example, are indicated in such a manner that Y1–2 means that the contact is the second contact of the first relay. And likewise with all the others. Each contact is shown in FIG. 1 as being in the state of standby. M1 is a motor to drive tape T1 for outgoing messages, and M2 is a motor to drive tape T2 for incoming messages and tone signal. SD1 and SD2 are plungers, and a hook button is released by action of plunger SD1. RPH–1, RPH–2 and RPH–3 are recording and reproducing heads of which RPH–1 is a related to tape T1 for outgoing messages, RPH–2 is for incoming messages and RPH–3 is for control signal. EH–1, EH–2 and EH–3 are erasing heads which respectively have relations with each recording and reproducing head, RPH–1, RPH–2 and RPH–3. P1, P2, P3 and P4 are switch devices composed of a pair of electric poles which are shorted by a conductive piece attached the end of tape. P1 is related to tape T1 for outgoing messages, and P2, P3 and P4 are related to tape T2 for incoming messages. P2 is shorted when tape T2 is wound up to its end. P3 and P4 are shorted when tape T2 is rewound back to its beginning end. TC is a timer circuit which energizes relay Y2 when its input terminal is in a grounded state or in an almost grounded state.

When the automatic telephone answering device receives bell signals from a caller, said signals are picked up by receiving device PU–1, amplified by amplifier A1, changed to direct current by rectifier D, and amplified again by direct current amplifier DA to actuate relay Y1. Being connected by the action of relay Y1, contact Y1–1 grounds the input terminal of timer circuit TC. But, at this time, timer circuit TC does not act as a timer because condenser C1 is disconnected from said input terminal as contact Y2–1 is opened. So, relay Y2 is energized without delay, whereby timer circuit TC is not connected with condenser C1. Timer circuit TC maintains relay Y2 energized while condenser C1 is being charged up. By closing contact Y2–3, plunger SD1 and motor M1 are started for action. With the action of plunger SD1, the hook button of the telephone is released and the telephone line is closed. With the action of motor M1, tape T1 for outgoing messages starts, and outgoing messages, such as "Hello! This is the Pioneer Corporation. There is no one in the office at present, so please leave your name and phone number. We will call you back promptly. Please start talking after hearing this outgoing message and you have thirty seconds to record your message. Thank you for calling," are sent out to the caller through head RPH–1, amplifier A5, speaker SP and the mouth piece of the hand set. After sending out said message, switch device P1 is closed for a moment by a conductive piece, and relay Y3 is energized and maintained in the energized state by its own contact Y3–1. At the same time, the other contacts of said relay Y3 are transferred and, by contact Y3–2, motor M2 begins to rotate whereby the incoming message of the caller is picked up by receiving device PU–2, amplified by amplifier A4 and recorded on upper track 1 of tape T2 by hear RPH–2. While the incoming message is being recorded, oscillator OSC is connected to amplifier A2 by contact Y3–6, and the tone signal of said oscillator OSC is recorded, in parallel with incoming messages, on lower track 2 of tape T2 by head RPH–3. When timer circuit TC which is already operating returns to the state of standby, relay Y2 is deenergized and, thus, relay Y3 is set free when contact Y2–2 opens. Motor M2 and plunger SD1 are disconnected from electrical source AC by contact Y2–3 and the automatic telephone answering device returns to the state of standby.

Now, hereinafter we shall describe in detail the operation of the automatic telephone answering device which is operated by remote control signals. When the owner calls his telephone equipped with the automatic telephone answering device, the automatic telephone answering device is operated in the same manner as above-mentioned. But if the remote control signal is sent to the automatic telephone answering device by the owner, after receiving outgoing messages, said signal is picked up by receiving device PU–3, amplified by amplifier A6, selected by reed-selector RS and then energizes relay Y5. By the closing of contact Y5–3, relay Y8 is energized as contact Y3–7 has been closed already. Plunger SD2 is energized because of the closing of contact Y8–1, to shift an idler to make possible the rewinding of tape T2 with motor M2.

The apparatus which has the circuit shown in FIG. 1 is unable to maintain tape T2 running backward if the remote control signal is stopped. However, an apparatus which is capable of entirely rewinding tape T2 by receiving a short remote control signal may be easily provided.

When tape T2 is entirely rewound up, a conductive piece attached to the beginning of tape T2 shorts switch device P3; current which runs through relay Y8 is suddenly decreased since resistor R2 has low resistance value; plunger SD2 is deenergized because of the opening of contact Y8-1, and, at the same time, an idler is shifted by said plunger SD2 to make possible the forward winding of tape T2 with motor M2.

On the other hand, relay Y7 is energized by contact Y5–1 of relay Y5 which is energized in the above-mentioned manner, and it maintains its ON state with its own contact Y7–1. Relay Y3 which is already in the ON state maintains such state with discharging current of condenser C3 at first and then with contact Y7–3, while contact Y5–2 is opened by the ON action or relay Y5. Relay Y2 is kept in its ON state by discharge current of condenser C2, while contact Y7–2 is opened and contact Y1–1 has been already opened. Reproducing head RPH–2 is connected to amplifier A5 by contact Y7–5 and Y3–4; erasing head EH–2 and EH–3 are disconnected from the electric source by contact Y7–6 so that the signals which are recorded on the upper and lower tracks of tape T2 are not erased. Incoming messages which have been already recorded are sent out over the telephone line by and through reproducing head RPH–2, contact Y7–5, Y3–4, amplifier A5, speaker SP and mouth piece of handset, as tape T2 is operating forward. On the other hand, the tone signal which has already been recorded on lower tract 2 of tape T2 is reproduced by reproducing head RPH–3, in parallel with the reproduction of incoming messages, and is sent to relay Y1 by and through contact Y7–7, amplifier A3, contact Y7–8, amplifier A1, rectifier D and direct current amplifier DA, and energizes relay Y1. As timer circuit TC is grounded again through contact Y1–1, relay Y2 is maintained in the ON state. In the above-mentioned manner, relay Y1 is maintained in the ON state during reproduction of tone signal, so incoming messages which have been recorded are capable of being heard over a telephone line. When incoming messages are completely reproduced, so is the tone signal, and relay Y1 turns to the OFF state because there is no energizing current by the reproduction of the tone signal. Then, after discharge of condenser C2, relay Y2 turns to the OFF state. But relay Y7 continues its ON state for a moment by discharging current of condenser C4; relay Y10 is energized by contact Y7–9, and, at this time, if switch SW is turned to (A), relay Y10 would not be able to maintain its ON state; however, if switch SW is turned to (B), relay Y10 maintains its ON state by own contact Y10–1 even if relay Y7 turns to the OFF state.

When switch SW is on (A), relay Y10 is turned to the OFF state as soon as relay Y7 is turned to the OFF state, and all parts of the automatic telephone answering device are in the state of standby as shown in FIG. 1.

When switch SW is on (B), relay Y10 can maintain its ON state by Y10–1, even if relay Y7 returns to the OFF state. Thus, motor M2 begins to rotate by the closing of contact Y10–2; plunger SD2 is energized by contact Y10–3; and then tape T2 is rewound again. At this time, incoming messages which have been reproduced are erased by erasing head EH–2, and the tone signal which has been reproduced is also erased in parallel with the above-mentioned incoming messages by erasing head EH–3, whereby contact Y7–6 is closed and direct current runs through those erasing head EH–2 and EH–3.

When tape T2 is entirely rewound up, a conductive piece attached to the beginning of tape T2 shorts switch device P4, therefore, relay Y10 turns to the OFF state; motor M2 is stopped and plunger SD2 de-energized by the opening of contacts Y10–2 and Y10–3; thus, all parts of the automatic telephone answering device are in the state of standby, and incoming message of the next caller can be recorded from this beginning end of tape T2 again.

In this invention, incoming messages and tone signal are recorded on the different tracks of the same tape, but the tape for tone signal can be provided independently, that is, one tape for incoming messages and another tape for tone signal. The said tape for tone signal is not required to be high in quality, and it can be short in length and operated at low speed compared with the tape for incoming messages.

If incoming messages are recorded to the end of tape T2, a caller can hear nothing but a buzzer tone. However, the owner can recognize that tape T2 has been fully recorded to its end. In this case, if the owner sends the remote control signal to the automatic telephone answering device, relay Y5 is energized, and it makes relay Y4 turn on to the OFF state with its contact Y5–4, and, thus, contact Y4–2 is transferred from the side of buzzer BU to the side of motors M1 and M2. Then, should the control signal be sent continuously, the automatic telephone answering device is operated as usual, and the entire incoming messages which have been recorded can be reproduced and heard. When the conductive piece attached to the end of tape T2 shorts switch device P2, relay Y4 is energized and maintained in the ON state with its own contact Y4–1 and contact Y4–2 energizes buzzer BU. Hearing the buzzer tone over the telephone line, the owner who is controlling the automatic telephone answering device can recognize that reproducing has been completed and motor M2 has stopped. Thus, tape T2 has stopped running and relay Y1 is in the OFF state because the tone signal is not reproduced. Consequently, all parts of the automatic telephone answering device are in the state of standby again.

Although the invention has been described and illustrated in detail, it is to be clearly understood that the same is by way of illustration and example only, and it is not to be taken by way of limitation; the spirit and scope of this invention being limited only by the terms of the appended claims.

What is claimed is:

1. An automatic telephone answering device, comprising:

(a) first receiving means for receiving bell signals,
(b) second receiving means for receiving incoming messages,
(c) third receiving means for receiving remote control signals, (d) first recording means for recording said incoming messages, (e) oscillator means oscillating during the recording period of said first recording means, (f) second recording means for recording the signals of said oscillator means on a different track from the track for said incoming messages, (g) rewinding means for rewinding the tape recording said incoming signals and said oscillated signals, in the recording period of said first recording means of said third receiving means receives remote control signals, (h) second reproducing means for reproducing signals recorded by said second recording means, (i) first reproducing means operated by the reproduced power of said second reproducing means, for reproducing said signals recorded by said first recording means, (j) selecting means operable between a first and a second position, such that when said selecting means is in said first position, the answering device is returned to standby after the reproducing period of said first and second reproducing means and when said selecting means is in said second position, the tape containing said incoming messages and said oscillating signal is automatically rewound after the reproducing period of said first and second reproducing means, (k) first and second erasing means for erasing said signals recorded by said first and second recording means, during the rewinding period of said rewinding means, and (l) holding means operated by the output power of said first receiving means or reproduced power of said second reproducing means for holding the telephone in the operating state during the reproducing period of said first and second reproducing means.

References Cited

UNITED STATES PATENTS

| | | | |
|---|---|---|---|
| 3,337,690 | 8/1967 | Martin | 179—6 |
| 2,615,989 | 10/1952 | Thad | 179—100.2 |
| 3,171,902 | 3/1965 | Jones | 179—100.2 |

JAMES W. MOFFITT, Primary Examiner

J. ROSENBLATT, Assistant Examiner

U.S. Cl. X.R.

179—100.1